Nov. 14, 1933.　　　　J. L. VIDAL　　　　1,935,422
APPARATUS FOR REPRODUCING GOFFERED FILMS
Filed Oct. 13, 1930　　2 Sheets-Sheet 1

INVENTOR
Jean Léon Vidal
BY Arthur Wright
ATTORNEY

Nov. 14, 1933. J. L. VIDAL 1,935,422
APPARATUS FOR REPRODUCING GOFFERED FILMS
Filed Oct. 13, 1930 2 Sheets-Sheet 2
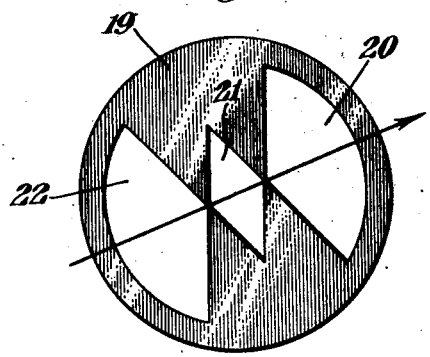
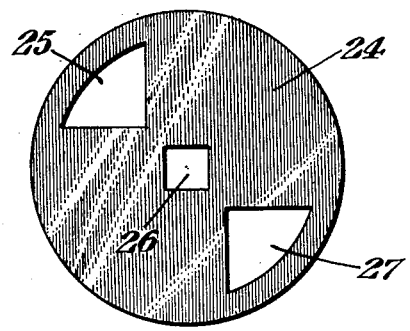
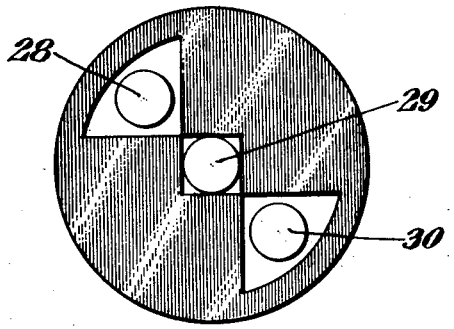
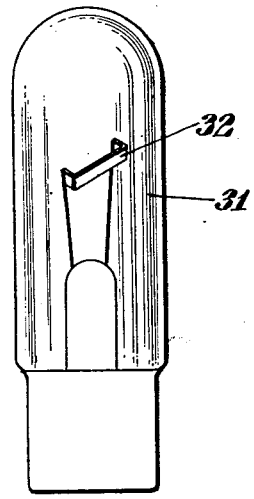
INVENTOR
Jean Leon Vidal
BY
Arthur Wright
ATTORNEY Patented Nov. 14, 1933

1,935,422

UNITED STATES PATENT OFFICE 1,935,422

APPARATUS FOR REPRODUCING GOFFERED FILMS

Jean Leon Vidal, Paris, France, assignor to Keller-Dorian Colorfilm Corporation, New York, N. Y., a corporation of Delaware Application October 13, 1930. Serial No. 488,282

10 Claims. (Cl. 95—75)

My invention relates especially to an improvement in the apparatus for the reproduction of goffered films such as are used in producing colored cinematographic pictures.

The object of my invention is the simplification of the reproduction of the pictures on goffered films. In my French Patent 690,591 of May 2nd, 1929, there was defined a new method of reproducing goffered films with crossed gofferage. In said application, I have accomplished the purpose thereof by means of a special diaphragm put in a special objective.

In the present application I have provided a more simple means by using a special source of light by means of which the reproduction is attained by having the two films in contact. In carrying out my invention, the film to be copied is placed in contact or approximately in contact with the virgin film with the lines of goffering of one film located at an angle to the line goffering of the other film but at such an angle as not to show moiré effects, that is to say at approximately more than 30° to each other. Therewith, I use a special source of light and a special diaphragm on the goffered side of the film to be copied and where the picture to be copied has been taken with a collimatric lens, I use a collimatric lens in the copying of the film on to the virgin film.

While my invention is capable of being carried out in many different ways by way of example, I have shown only certain embodiments of the apparatus which can be used in carrying out my invention in the accompanying drawings, in which:

Fig. 4 is an elevation of another form of diaphragm, used when the gofferings are located at an angle other than 90° to each other;

Fig. 5 is an elevation of a modified form of diaphragm in which the openings are smaller but in the same relative location as in Fig. 3;

Fig. 6 is a similar view of the diaphragm as shown in Fig. 3 but with three lamps positioned opposite the three spaces in the diaphragm respectively, instead of one lamp as in Fig. 1; and Fig. 7 is an elevation of a special kind of lamp which may be used in my apparatus, if desired.

Figure 1:
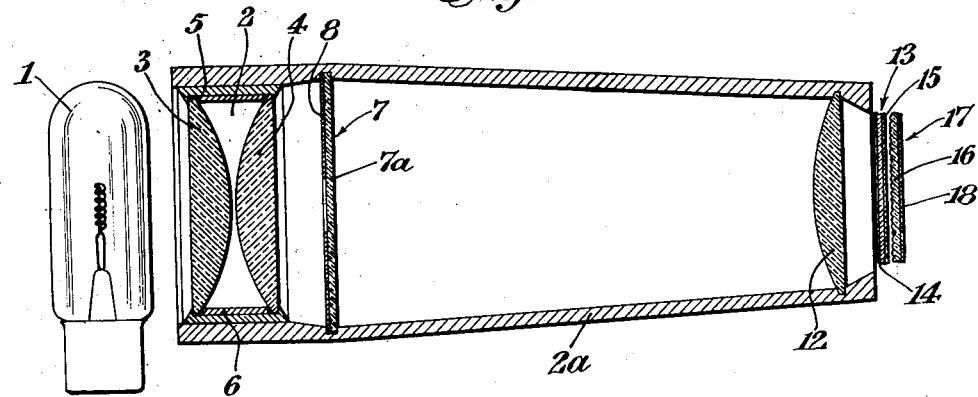
Fig. 1 is a diagrammatic elevation of an arrangement whereby my invention can be carried out.
Figure 3:
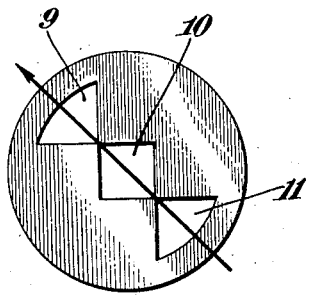
Fig. 3 is an elevation of one form of diaphragm used when the line gofferings are located at 90° to each other.

In the Figures 1 and 3, I have shown an ordinary lamp 1, located so as to project light through any suitable condenser 2, in a mounting 2a, which in this instance is shown as a pair of plano-convex lenses 3 and 4 carried in a cylindrical mounting 5 and held in place by a ring 6. On the other side of the condenser 2, I locate a diaphragm 7 made of any desired opaque material 8 carried on the face of a ground glass plate 7a. This diaphragm, when the gofferings of the two films, as hereinafter referred to, are located at 90° to each other for example when the film to be copied has a vertical or longitudinal goffering and the virgin film has a crosswise goffering, will have three openings 9, 10, 11 corresponding to the areas respectively, where the red, green and blue of the color filter, in 3 bands of red, green and blue, of the camera objective register with the similar color bands in red, green and blue of the projecting machine to be used with the film carrying the reproduction of the picture made as hereinafter referred to, in accordance with my present invention. In other words, the 3 color bands of the color filter of the camera objective are in a position, in this embodiment of my invention, at right angles to the position of the three bands of the color filter used for projecting the reproduced film made in accordance with this present invention, it being understood, however, that the color bands of the filter are parallel to the line goffering of the film in the camera, and that the same is true in the projecting machine. It will be understood, however, that this line of openings 9, 10 and 11, as shown by the arrow in Fig. 3 is on the line bisecting the angle between the lines of gofferings of the two films, but that this line of openings may just as well be at right angles to those shown in Fig. 3, so long as the openings 9, 10 and 11 correspond respectively to the common red, green and blue areas of the two color filters as referred to above. The diaphragm 7 is located in the focal plane of a collimatric lens, 12, which is placed near a goffered film 13, taken in the usual goffered film camera with a color filter having three bands of color, red, green and blue, of equal areas, to be copied, when said film has been taken in the camera with a collimatric lens. The film 13 may be a positive or a negative, an original or a copy, but preferably an original positive. But when the film to be copied has not been taken with a collimatric lens, the diaphragm 7 is located the same distance from the film 13 to be copied, as the latter was from its diaphragm in the camera, when the picture was taken thereon. It is noted further, the film 13 to be copied has its vertical line goffering 14 facing towards the diaphragm 7 and its picture-carrying emulsion 15 facing towards the rear and preferably in contact with the line goffering 16 located crosswise of the virgin film 17, having its sensitive emulsion surface 18 located at the rear thereof. After the copy has been made by suitable exposure of the film 17 to the light in this way it is subjected to any usual development and finishing operations. When the film 13 is an original positive the film 17 is developed and inverted in the usual way. The film 17 thus produced carries an accurate reproduction of the images of the film 13, and can then be run through the ordinary goffered film projecting machine with the red, green and blue banded color filter having the three color bands of equal areas located at right angles to the position of the bands in the color filter of the camera objective, but parallel to the lines of goffering in the projection machine. It will be understood, however, that the gofferings of the films 13 and 17 may instead be crosswise and lengthwise of the films respectively, or may be at an angle to both the respective films provided the gofferings are at an angle to each other as above referred to.

As another embodiment of my invention, I have shown in Fig. 4 a diaphragm 19, mounted in the same way as above, to be used with line gofferings where the line gofferings of the two films are not at right angles to each other. Here, however, also the diaphragm 19 has three openings 20, 21, 22, corresponding to the common red, green and blue areas respectively of the two color filters in the camera and projecting machine, the direction of the three openings as shown by the arrow therein being in a line bisecting the angle between the two lines of gofferings.

Figure 2:
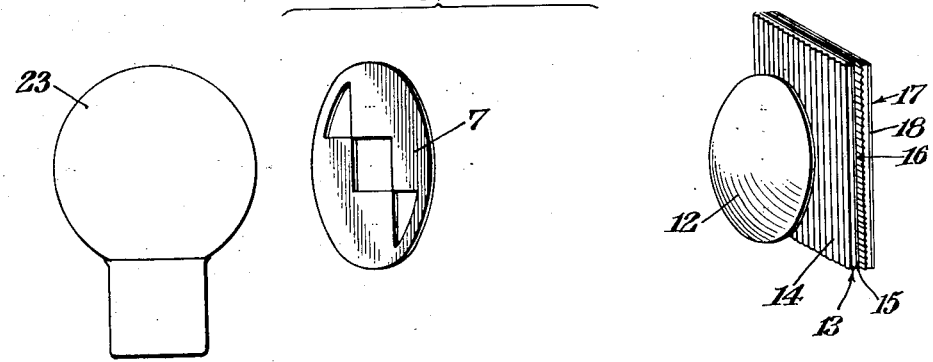
Fig. 2 is a perspective view of the same.

In Fig. 2 I have shown a modified construction in which the apparatus is the same as in Fig. 1, but in which instead there is a lamp 23 having a ground glass surface to diffuse the light, instead of the condenser 2.

In Fig. 5 I have shown a slightly modified form of diaphragm 24 which may be used with the constructions shown in Figs. 1 and 2, for example, and in which the three color areas, 25, 26 and 27, are somewhat smaller, but in which the relative areas remain the same but are separated from each other.

In Fig. 6 I have shown a modification, in which instead of one light source three ground glass lamps 28, 29, 30 are positioned, for example, behind the openings 9, 10 and 11 respectively in a diaphragm 7.

As to all the diaphragms, it is to be understood, however, that the openings corresponding to the respective colors in the diaphragm can be varied in area one to another in such a way as to increase any one or more of the colors with regard to the other color or colors, to thereby regulate the respective amounts of the colors to be ultimately projected.

Furthermore, as shown in Fig. 7, I may use instead of the electric lamp, an electric lamp known as the Phillips lamp 31 in which the illumination is from an incandescent rectangular plate 32 which provides an even illumination, even if there is no ground glass 7a used, so that the image of said plate 32 becomes directed on to the films 13 and 17 in such a way as to be parallel to the side of the whole picture taken at any particular time in the advancement of the films 13 and 17.

It will be understood, of course, that the films 13 and 17 are advanced and stopped step by step in any suitable way and by any suitable mechanism in the usual way provided for taking contact prints in the reproduction of cinematographic films of the ordinary kind.

While I have described my invention in detail it is to be understood that I may make many changes therein without departing from the spirit of the same.

I claim

1. In combination, a source of light, associated with a line-goffered film having an image to be copied, and a line-goffered film substantially adjacent thereto on which the image is to be copied the line-gofferings being at an angle to each other and a diaphragm located before the source of light, the diaphragm having a series of apertures located on the median line between the film gofferings, and a collimatric lens between the films and the diaphragm, the diaphragm being at the focal plane of the collimatric lens.

2. In combination, a source of light, associated with a line-goffered film having an image to be copied, and a line-goffered film substantially adjacent thereto on which the image is to be copied, the line-gofferings being at an angle of more than 30° to each other and a diaphragm located before the source of light, the diaphragm having a series of apertures located on the median line between the film gofferings and a collimatric lens between the films and the diaphragm, the diaphragm being at the focal plane of the collimatric lens.

3. In combination, a source of light, associated with a line-goffered film having an image to be copied, and a line-goffered film substantially adjacent thereto on which the image is to be copied, the line-gofferings being at an angle to each other, with the goffering of the film to be copied located lengthwise and the goffering of the other film cross-wise of the film, and a diaphragm located before the source of light, the diaphragm having a series of apertures located on the median line between the film gofferings, and a collimatric lens between the films and the diaphragm, the diaphragm being at the focal plane of the collimatric lens.

4. In combination, a source of light, associated with a line-goffered film having an image to be copied, and a line-goffered film substantially adjacent thereto on which the image is to be copied the line-gofferings being at an angle to each other and a diaphragm located before the source of light and the films having a series of apertures located on the median line between the film gofferings, the films being located the same distance from the diaphragm as the film was from the diaphragm in the camera in which the image was taken.

5. In combination, a source of light, associated with a line-goffered film having an image to be copied, and a line-goffered film substantially adjacent thereto on which the image is to be copied the line-gofferings being at an angle of more than 30° to each other and a diaphragm located before the source of light and the diaphragm having a series of apertures located on the median line between the film gofferings, the films being located the same distance from the diaphragm as the film was from the diaphragm in the camera in which the image was taken.

6. In combination, a source of light, associated with a line-goffered film having an image to be copied, and a line-goffered film substantially adjacent thereto on which the image is to be copied, the line-gofferings being at an angle to each other, with the goffering of the film to be copied located lengthwise and the goffering of the other film cross-wise of the film, and a diaphragm located before the source of light and the diaphragm having a series of apertures located on the median line between the film gofferings, the films being located the same distance from the diaphragm as the film was from the diaphragm in the camera in which the image was taken.

7. In combination, a source of light, associated with a line-goffered film having an image to be copied, and a line-goffered film substantially adjacent thereto on which the image is to be copied, the line-gofferings being at an angle to each other and a diaphragm located before the source of light and the diaphragm having a series of apertures located on the median line between the film gofferings, said apertures corresponding to the overlapping light areas of a like series of colors in the two color filters used in the picture-taking and projecting machines.

8. In combination, a source of light, associated with a line-goffered film having an image to be copied, and a line-goffered film substantially adjacent thereto on which the image is to be copied, the line-gofferings being at an angle of more than 30° to each other and a diaphragm located before the source of light and the diaphragm having a series of apertures located on the median line between the film gofferings, said apertures corresponding to the overlapping light areas of a like series of colors in the two color filters used in the picture-taking and projecting machines.

9. In combination, a source of light, associated with a line-goffered film having an image to be copied, and a line-goffered film substantially adjacent thereto on which the image is to be copied, the line-gofferings being at an angle to each other, with the goffering of the film to be copied located lengthwise and the goffering of the other film crosswise of the film, and a diaphragm located before the source of light and the diaphragm having a series of apertures located on the median line between the film gofferings, said apertures corresponding to the overlapping light areas of a like series of colors in the two color filters used in the picture-taking and projecting machines.

10. In combination, a source of light, associated with a line-goffered film having an image to be copied, and a line-goffered film substantially adjacent thereto on which the image is to be copied, no objective being located between the films, the line-gofferings being at an angle to each other and a diaphragm located before the source of light and the films having a series of apertures located on the median line between the film gofferings, the source of light being in the form of a plurality of units each positioned opposite to one of the diaphragm apertures.

JEAN LEON VIDAL.